US012650848B2

(12) United States Patent
   Chun

(10) Patent No.: US 12,650,848 B2
(45) Date of Patent: Jun. 9, 2026

(54) BOOT CLUSTER INDICATION IN A COMPUTER SYSTEM

(71) Applicant: QUALCOMM Incorporated, San Diego, CA (US)

(72) Inventor: Christopher Kong Yee Chun, Austin, TX (US)

(73) Assignee: Qualcomm Incorporated, San Diego, CA (US)

( * ) Notice: Subject to any disclaimer, the term of this patent is extended or adjusted under 35 U.S.C. 154(b) by 238 days.

(21) Appl. No.: 18/327,654

(22) Filed: Jun. 1, 2023

(65) Prior Publication Data

US 2024/0403062 A1      Dec. 5, 2024

(51) Int. Cl.
   *G06F 9/4401* (2018.01)

(52) U.S. Cl.
   CPC .................................. *G06F 9/4403* (2013.01)

(58) Field of Classification Search
   None
   See application file for complete search history.

(56) References Cited

U.S. PATENT DOCUMENTS

| | | | |
|---|---|---|---|
| 8,060,661 B1 | 11/2011 | Wright | |
| 2005/0104617 A1* | 5/2005 | Abe .................... | H03M 1/1057 |
| | | | 326/82 |

| | | | |
|---|---|---|---|
| 2007/0188186 A1* | 8/2007 | Kiryu .................... | G06F 1/3203 |
| | | | 326/41 |
| 2014/0188298 A1 | 7/2014 | Brooks et al. | |
| 2018/0097839 A1* | 4/2018 | Upasani ................ | H04L 9/0631 |
| 2021/0124594 A1 | 4/2021 | Rajagopal et al. | |
| 2023/0133848 A1* | 5/2023 | Carey .............. | G01R 31/31703 |
| | | | 324/762.02 |
| 2023/0238872 A1* | 7/2023 | Kowkutla ............... | H02M 3/04 |
| | | | 327/538 |
| 2024/0036626 A1* | 2/2024 | Nam ..................... | G06F 1/3203 |

FOREIGN PATENT DOCUMENTS

| | | |
|---|---|---|
| JP | 2007079881 A | 3/2007 |

OTHER PUBLICATIONS

International Search Report and Written Opinion—PCT/US2024/023814—ISA/EPO—Jul. 26, 2024.

* cited by examiner

*Primary Examiner* — Fahmida Rahman
(74) *Attorney, Agent, or Firm* — Loza & Loza, LLP

(57) ABSTRACT

Aspects of the present disclosure are directed to techniques and apparatuses for implementing a power-on (PON) sequence in a computer system. A power management integrated circuit (PMIC) receives a boot circuit indicator (BCI) signal from a computer system. The BCI signal identifies a circuit of the computer system to be enabled in a power-on (PON) sequence. The PMIC provides power to the boot core or cluster of the SoC based on the BCI signal.

24 Claims, 10 Drawing Sheets

900

Output a boot circuit indicator (BCI) signal to a power management integrated circuit (PMIC), the BCI signal identifying a circuit of the computer system to be enabled in a power-on (PON) sequence of the computer system 910

Receive power from the PMIC to supply power to the circuit identified by the BCI signal in the PON sequence 920

PON trigger

Determine boot cluster based on BCI signal

Turn on regulator of boot cluster and de-assert Reset to SoC

600

602

PON Trigger

604

De-assert Reset to SoC

606

Determine boot cluster based on BCI

800

| Analog Values | Digital Values | Boot Cluster/Core |
|---------------|----------------|-------------------|
| V0 | 00 | 0 |
| V1 | 01 | 1 |
| V2 | 10 | 2 |
| V3 | 11 | 3 |

Output a boot circuit indicator (BCI) signal to a power management integrated circuit (PMIC), the BCI signal identifying a circuit of the computer system to be enabled in a power-on (PON) sequence of the computer system

920

Receive power from the PMIC to supply power to the circuit identified by the BCI signal in the PON sequence

1000

1010

Receive a boot circuit indicator (BCI) signal from a computer system, the BCI signal identifying a circuit of the computer system to be enabled in a power-on (PON) sequence of the computer system

1020

Supply power to the circuit identified by the BCI signal in the PON sequence

BOOT CLUSTER INDICATION IN A COMPUTER SYSTEM

TECHNICAL FIELD

The technology discussed below relates generally to a power-on sequence of a computer system, in particular, a power-on sequence using a boot circuit indicator.

INTRODUCTION

A computer system can be implemented using a system-on-a-chip (SoC) design. A SoC is an integrated circuit (IC) that can integrate various components of a computer or other electronic system into a single chip. This integration can enable faster speeds and lower power consumption than traditional computer systems that use separate chips for each component or function. SoCs can be used in a wide variety of devices, including smartphones, mobile devices, network entities, tablets, laptops, and vehicles. In some examples, a SoC can include two or more processor cores (or simply referred to as "cores"). The cores are separate processing units that can execute instructions independently. The cores may be grouped into different clusters in a SoC. A cluster can include one or more processing cores and their associated hardware resources, such as cache memory, shared buses, communication interfaces, and other components that are designed to work together to execute software tasks efficiently.

A power-on sequence of a SoC is a process of powering up the various components (cores or clusters) of the SoC in a specific order to ensure proper operation. The power-on sequence typically begins with the power supply being turned on, which causes the voltage regulators to start generating power for the various components of the SoC. The clock generators then start generating clock signals for the cores and other components. The cores then start executing code that supports the primary boot loader (PBL) operations.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a form as a prelude to the more detailed description that is presented later.

Aspects of the present disclosure are directed to techniques and apparatuses for implementing a power-on (PON) sequence in a computer system. A power management integrated circuit (PMIC) can receive a boot circuit indicator (BCI) signal from a system-on-a-chip (SoC) that includes multiple computing cores/clusters. The BCI signal can identify a circuit (e.g., boot core/cluster of the SoC) to be enabled or powered on in the PON sequence. The PMIC provides power to the circuit (e.g., boot core or cluster) used in the PON sequence of the SoC based on the BCI signal.

One aspect of the present disclosure provides a computer system that includes a plurality of computing clusters. The computer system further includes boot circuit identifying circuitry configured to output a boot circuit indicator (BCI) signal to a power management integrated circuit (PMIC), the BCI signal identifying a circuit (e.g., a boot cluster among a plurality of computing clusters) of the computer system to be enabled in a power-on (PON) sequence of the computer system. The computer system further includes power circuitry configured to receive power from the PMIC to supply power to the circuit identified by the BCI signal in the PON sequence.

Another aspect of the present disclosure provides a power management integrated circuit (PMIC) that includes boot circuit detection circuitry configured to receive a boot circuit indicator (BCI) signal from a computer system. The BCI signal identifies a circuit (e.g., a boot cluster among a plurality of computing clusters) of the computer system to be enabled in a power-on (PON) sequence of the computer system. The PMIC further includes power circuitry configured to supply power to the circuit identified by the BCI signal in the PON sequence.

Another aspect of the present disclosure provides a method of booting up a computer system. The method includes outputting a boot circuit indicator (BCI) signal to a power management integrated circuit (PMIC), the BCI signal identifying a circuit (e.g., a boot cluster) of the computer system to be enabled in a power-on (PON) sequence of the computer system. The method further includes receiving power from the PMIC, the power destinated to the circuit identified by the BCI signal in the PON sequence.

Another aspect of the present disclosure provides a method of supplying power using a power management integrated circuit (PMIC). The method includes receiving a boot circuit indicator (BCI) signal from a computer system, the BCI signal identifying a a circuit (e.g., a boot cluster) of the computer system to be enabled in a power-on (PON) sequence of the computer system. The method further includes supplying power to the circuit identified by the BCI signal in the PON sequence.

To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

3

Figure 7:
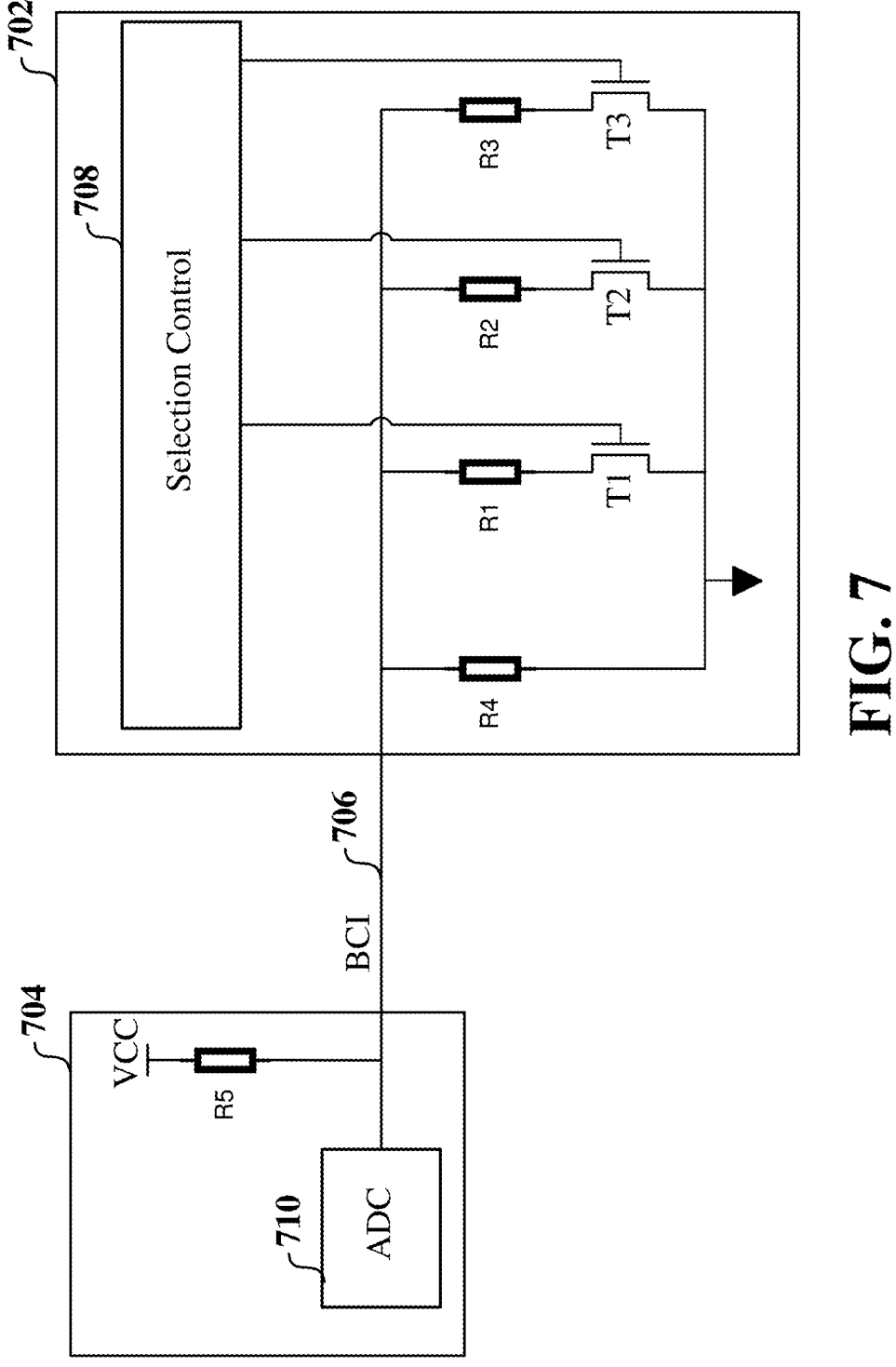

FIG. 7 is a block diagram illustrating exemplary boot cluster indication circuitry according to some aspects of the present disclosure.

FIG. 8 illustrates a table of exemplary mapping between analog values and boot clusters according to some aspects of the present disclosure.

Figure 9:
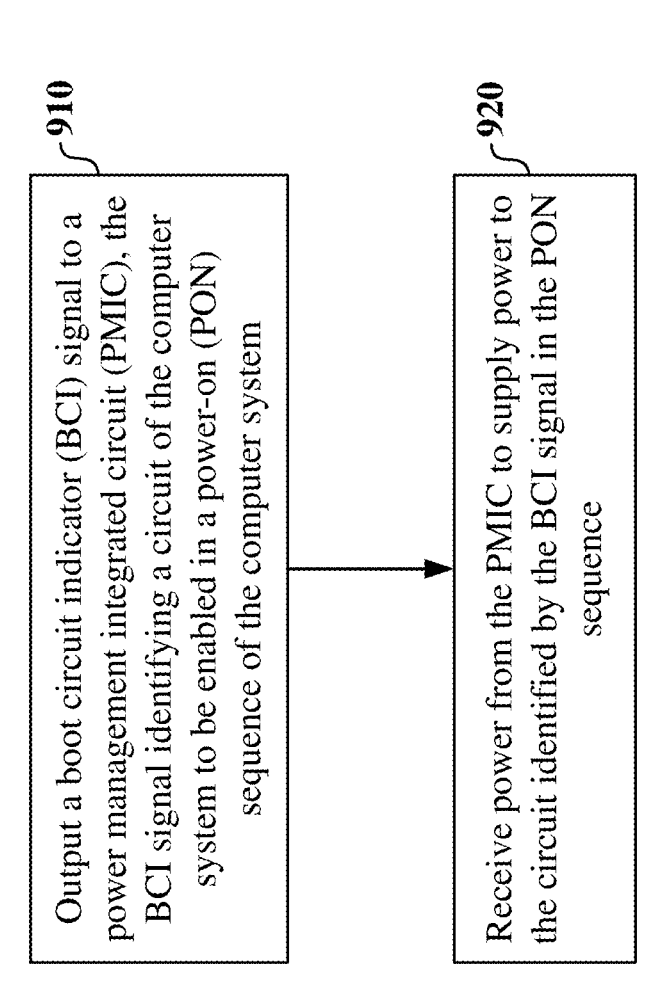

FIG. 9 is a flow chart of a method for indicating a boot cluster of a SoC according to some aspects of the present disclosure.

Figure 10:
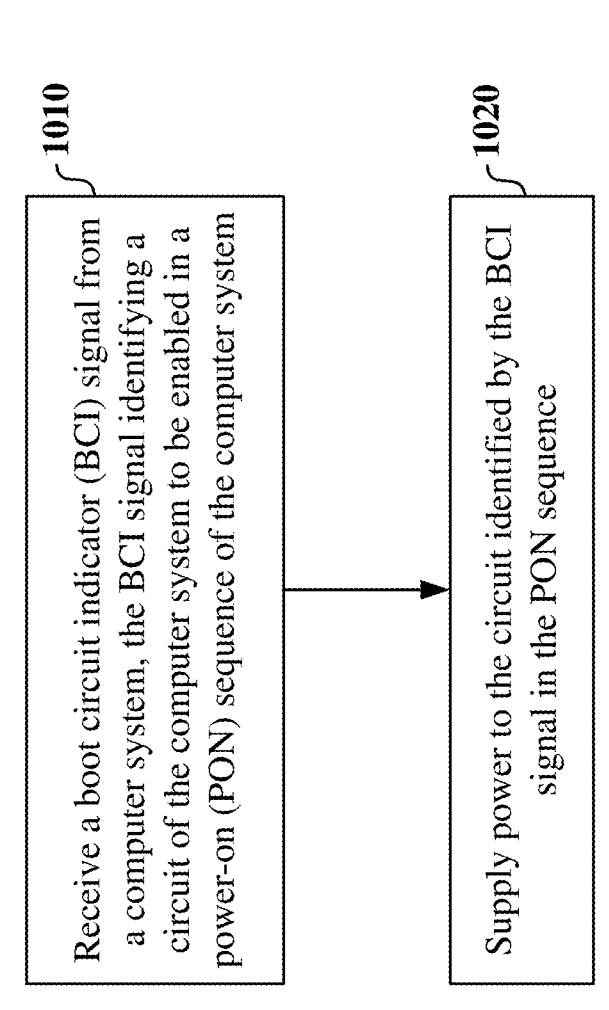

FIG. 10 is a flow chart of a method for supplying power to a SoC based on a boot circuit indicator signal according to some aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Some aspects of the present disclosure provide techniques and procedures for implementing a power-on (PON) sequence in a computer system. A power management integrated circuit (PMIC) receives a boot circuit indicator (BCI) signal from a system-on-a-chip (SoC) that includes multiple cores and/or clusters. The BCI signal identifies a boot core/cluster of the SoC. The PMIC controls the power supplied to the SoC based on the BCI signal.

Figure 1:
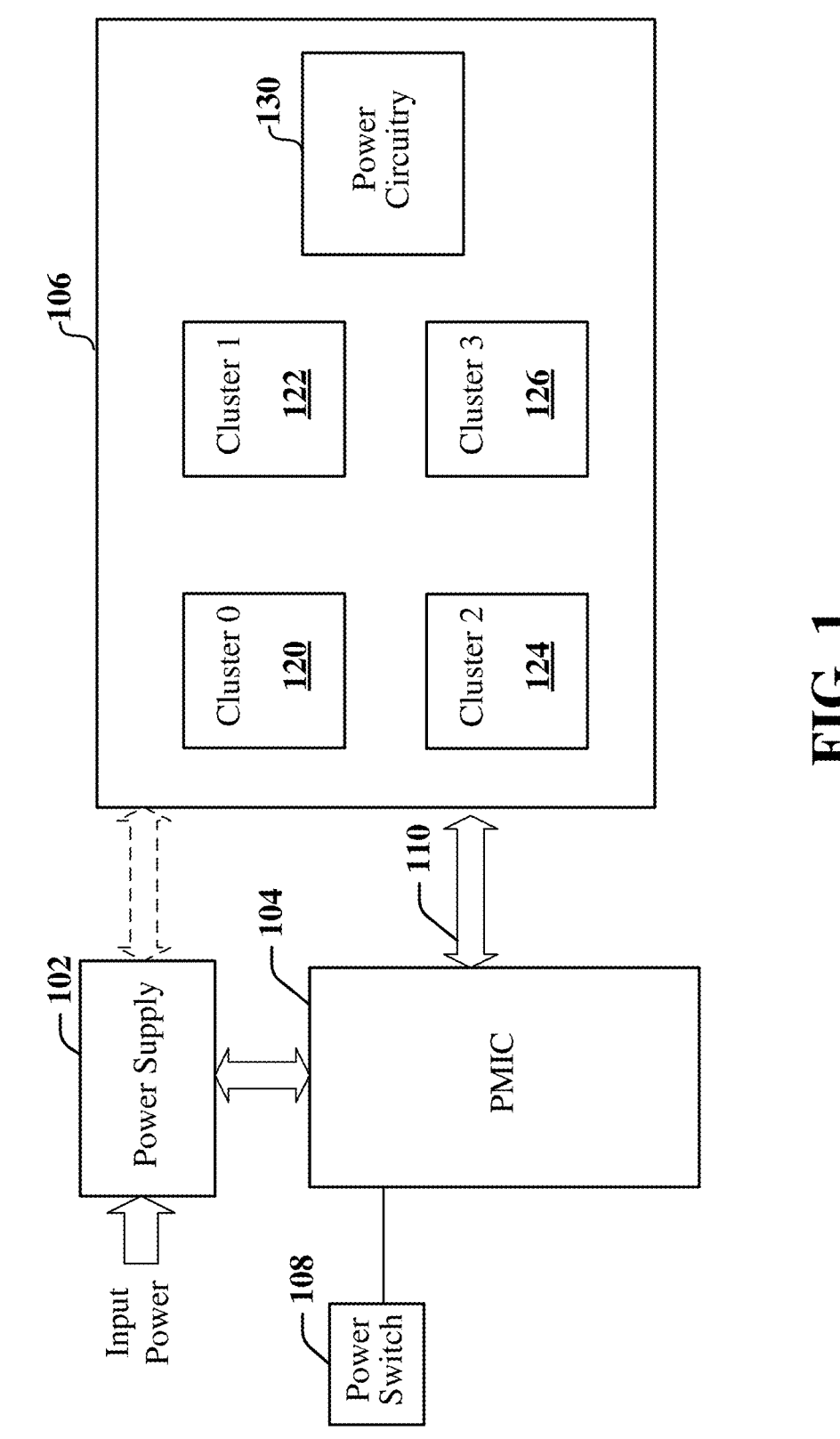
FIG. 1 is a block diagram illustrating a computer system with multiple cores/clusters according to some aspects of the present disclosure.

FIG. 1 is a block diagram illustrating a computer system 100 according to some aspects of the disclosure. The computer system 100 may include a power supply 102, a power management integrated circuit (PMIC) 104, and a system-on-a-chip (SoC) 106. In some examples, the computer system 100 may be implemented in a portable computer, a tablet, a smartphone, a wearable device, a wireless communication device, a network entity (e.g., base station), etc. The computer system 100 may include other components for various functions, for data storage, communication, input/output interfaces, etc.

The power supply 102 can supply power to the computer system 100 via the PMIC 104 or directly. The power supply 102 can convert alternating current (AC) power or direct current (DC) power (e.g., battery power) into the power that the computer system 100 or PMIC 104 needs to operate. For example, the PMIC 104 can convert the power received from the power supply 102 into different voltages 110 that the computer system 100 (e.g., SoC 106) needs to operate. The PMIC 104 can regulate the voltages supplied to the SoC 106 to ensure that the SoC 106 is getting the correct voltages and power. In some examples, the PMIC 104 can be embedded in the power supply 102. There are different types of PMICs, each designed for a specific application. Some PMICs are designed for low-power applications, while others are designed for high-power applications. Some PMICs are designed for single-voltage applications, while others are designed for multi-voltage applications. In some aspects, the PMIC 104 can be included in the SoC 106. In some aspects, the SoC 106 can include multiple computing clusters (e.g., four clusters 120, 122, 124, and 126 are shown as cluster 0, cluster 1, cluster 2, and cluster 3 in FIG. 1). In other examples, the SoC 106 may include more or fewer than four clusters shown in FIG. 1. The computer system 100 may have a power switch 108 that can send a signal to the PMIC 104 to enable or turn on the power supply 102 to supply power.

In some aspects, the PMIC 104 can supply separate voltage rails to different clusters (e.g., clusters 120, 122, 124, and 126) in the SoC 106 to optimize power consumption and performance. The clusters of the SoC 106 can have different voltage and power requirements based on their specific design, workload, and/or applications. In some aspects, the PMIC 104 can adjust the voltage levels and power delivery to different clusters to optimize performance and/or minimize power consumption in different use cases and scenarios. For example, if one cluster (e.g., cluster 120) is running a compute-intensive task, the PMIC 104 can supply more power to that cluster, while reducing power to other clusters 122, 124, and/or 126 that may be idle or performing less intensive tasks.

In some aspects, the SoC 106 may include power circuitry 130 to convert the input voltage to the required voltage levels or rails. For example, the power circuitry 130 may include one or more voltage regulators to provide the voltage rails. In some aspects, the power regulators can be located in the PMIC 104. In some aspects, the SoC 106 can dynamically and independently adjust the voltage and power supplied to the clusters 120, 122, 124, and 126.

Figure 2:
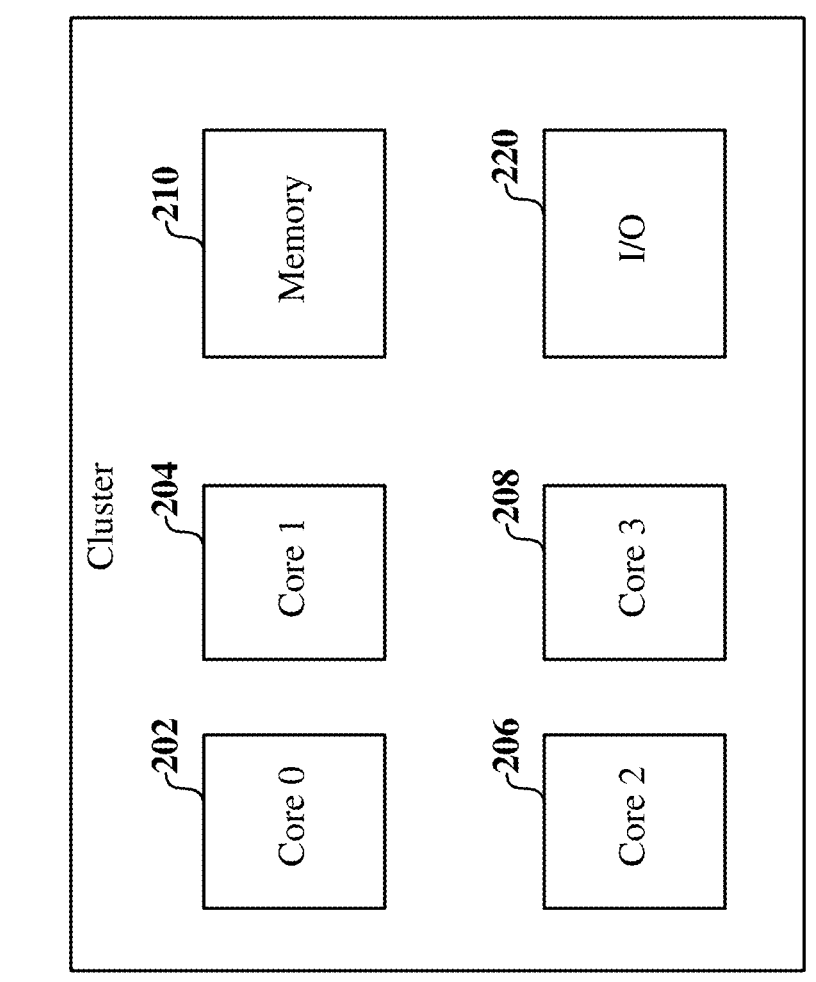
FIG. 2 is a block diagram illustrating an exemplary cluster according to some aspects of the present disclosure.

FIG. 2 is a block diagram illustrating an exemplary computing cluster 200 according to some aspects of the disclosure. The cluster 200 may be implemented as one or more of the clusters 120, 122, 124, and 126 of FIG. 1. A cluster can include one or more processing cores that can work together to perform a specific task or set of tasks. In one example, the computing cluster 200 includes four cores 202, 204, 206, and 208 (e.g., core 0, core 1, core 2, and core 3 shown in FIG. 2). The cluster 200 can include other components, for example, a memory 210 such as SRAM (static random-access memory) and/or DRAM (dynamic random-Access memory), to store data and instructions that are used by the cores. The cluster 200 can include interconnects or buses that allow the cores and other components to communicate with each other. The cluster 200 can include an I/O (Input/Output) interface (e.g., I/O interface 220). Some examples of interfaces are network interfaces and display controllers, that enable the cluster 200 to communicate with the outside world. In some aspects, the cluster 200 may include power management components such as voltage regulators that help regulate the power supply to the cluster/cores and optimize power consumption.

In some aspects, the computing cluster 200 may include more or fewer processing cores than the four cores shown in FIG. 2. The cores 202, 204, 206, and 208 can execute instructions independently or collaboratively. In some aspects, a core may be a processor such as a central processing unit (CPU), a graphical processing unit (GPU), a digital signal processor (DSP), a controller, a microcontroller, an application processor (AP), a neural processing unit (NPU), a field-programmable gate array (FPGA), etc. Cores in the same cluster can share resources, such as memory 210 and I/O interfaces 220. Clustering can simplify the management of resources and enable better performance and efficiency in the computer system. For example, the cores in the same cluster can share a cache memory, which can be faster and more energy-efficient than accessing memory from a remote location. Therefore, cores in the same cluster can communicate more efficiently and share data more quickly. The use of clusters can enable more fine-grained power management and control, for example, as each cluster can be independently powered on and off based on workloads. Furthermore, clustering can be used to improve system reliability and fault tolerance. If one core in a cluster fails, the remaining cores in the cluster can continue to operate, allowing the system to maintain functionality.

In some aspects, one cluster (e.g., cluster 0 or 1) of the SoC 106 can be a boot cluster that is responsible for managing the boot process of the SoC. The boot cluster contains the hardware components (e.g., a boot core) and software routines used to initialize the system and load the operating system into memory. During the boot process, for example, the boot cluster can execute firmware code, which can be stored in non-volatile memory such as flash memory or ROM, to initialize the various components of the SoC, including memory controllers, input/output interfaces, other peripherals, etc. Once the initialization process is completed, the boot cluster can load the operating system into memory and transfer control to the operating system. A core within a boot cluster that performs the boot process can be referred to as the boot core.

A power-on (PON) sequence of the SoC 106 is the process of powering up the various components (e.g., computing clusters) of the SoC in a specific order to ensure proper operation. The PON sequence can begin with the power supply 102 being turned on or enabled to provide power to the PMIC 104. The PON sequence can turn on the voltage regulators and clocks that are used to support the primary boot loader (PBL) operation. A PBL is a small program that is executed by the SoC boot cluster/core when the system is first powered on or reset. The PBL is responsible for initializing the hardware components used during booting of the system. In some examples, the PBL can load a secondary boot loader, which can be a larger program that is responsible for loading the operating system. The PBL can be stored in a non-volatile memory, such as ROM or flash memory (e.g., memory 210 of FIG. 2). The PBL can run on a specific core (e.g., a boot core).

In some aspects, the boot core can be defined by fuses included in the SoC 106. The states (e.g., closed or opened) of the fuses can be set during the fabrication of the SoC. In the SoC, a fuse can function as a type of non-volatile memory that is used to store configuration data that is set during manufacturing and cannot be changed afterward. One of the common uses of fuses in SoCs is to define the boot core, which executes the PBL during the PON sequence. The specific fuse states (e.g., bit values) that are programmed to define the boot core can vary depending on the design of the SoC. During the PON sequence of the SoC, the fuse settings or states determine which core should execute the boot code. For example, the boot core can be defaulted to be in a boot cluster (e.g., cluster 0). In some examples, however, it is possible that the boot core can be in cluster 0 or cluster 1. However, the PON sequence needs to turn on the regulators to supply power to both clusters before the PON sequence can determine which cluster includes the boot core, thus increasing power consumption of the system. Furthermore, there is a risk that one of the clusters has a fault, for example, a soft short circuit. A soft short circuit is a temporary or intermittent electrical connection between two or more conductive elements of a cluster. A soft short circuit can be difficult to diagnose and fix. Over time, a soft short circuit can get worse and cause a failure of the cluster.

In some aspects of the disclosure, the SoC 106 can send a boot circuit indicator (BCI) signal to the PMIC 104. The PMIC 104 can determine the boost cluster based on the BCI signal so that the PMIC only turns on the voltage regulator associated with the boot cluster. Other voltage rails for other clusters can remain turned off during the PON sequence. In some aspects, the techniques for generating and using the BCI signal described herein can be implemented in other computer systems and chipsets, and are not limited to a SoC or the like.

Figure 3:
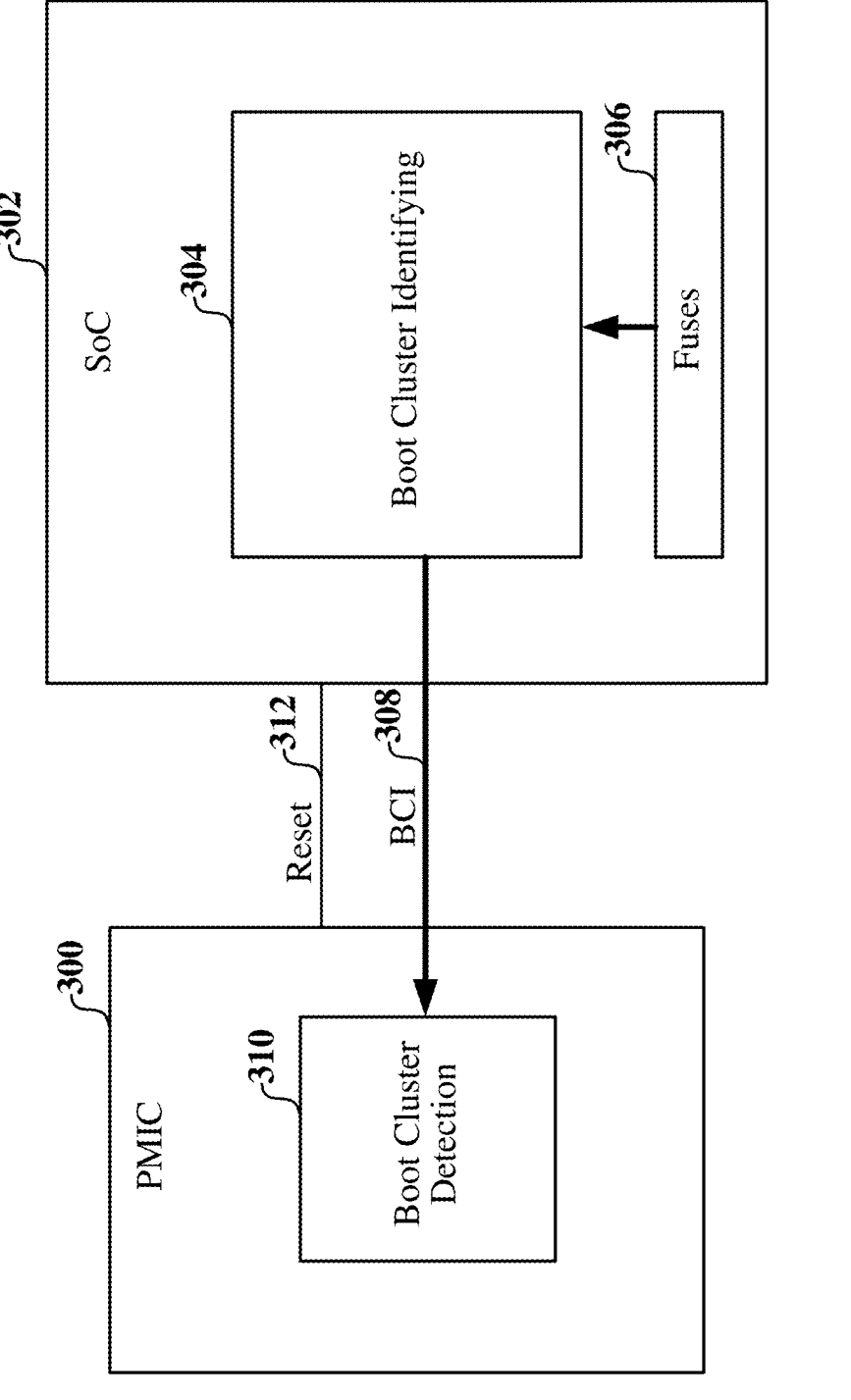
FIG. 3 is a block diagram illustrating a power management integrated circuit (PMIC) and a system-on-a-chip (SoC) using boot cluster information according to some aspects of the present disclosure.

FIG. 3 is a block diagram illustrating a PMIC 300 receiving boot cluster information from a SoC 302 according to some aspects of the disclosure. In some aspects, the PMIC 300 may be the same as the PMICs (e.g., PMIC 104) described above, and the SoC 302 may be the same as the SoCs (e.g., SoC 106) described above in FIGS. 1 and 2. In some examples, PMIC 300 can be any PMIC, and the SoC 302 can be any SoC or computer system that can provide a BCI signal to the PMIC 300.

In some aspects, the SoC 302 includes boot circuit identifying circuitry 304 that can be configured to read the states of fuses 306 to determine the boot core/cluster. The states of fuses (e.g., opened or closed) can indicate the boot cluster. The boot circuit identifying circuitry 304 detects the states of the fuses and converts the states into a BCI signal 308 that indicates the boot cluster or boot core. For example, the fuses 306 may include four fuses respectively corresponding to four clusters (e.g., clusters 0, 1, 2, 3 of FIG. 1). In one example, an opened fuse can indicate that the associated cluster is the boot cluster. In one aspect, the boot circuit identifying circuitry 304 can convert the fuse information into a binary-coded value that identifies the boot cluster. For example, the binary-coded values 00, 01, 10, and 11 respectively indicate the clusters 0, 1, 2, and 3. In one aspect, the boot circuit identifying circuitry 304 can convert the fuse information into a one-hot binary value that identifies the boot cluster. For example, the one-hot binary value 0001, 0010, 0100, and 1000 can respectively indicate the clusters 0, 1, 2, and 3. In one aspect, the boot circuit identifying circuitry 304 can convert the fuse information into a pulse width modulated (PWM) signal. A PWM signal can be used to encode the fuse information by varying the period and/or width of the pulse. For example, the boot circuit identifying circuitry 304 can use four different pulse widths (e.g., pulse widths of 0%, 25%, 50%, and 75%) to respectively indicate the clusters 0, 1, 2, and 3. In some aspects, the boot circuit identifying circuitry 304 can convert the fuse information into a train of digital pulses that indicate the boot cluster. Each cluster can be presented by a unique pattern of pulses. In some aspects, the boot circuit identifying circuitry 304 can convert the fuse information into an analog value. For example, the boot circuit identifying circuitry 304 can use four different analog voltage levels or resistive values to respectively indicate the clusters 0, 1, 2, and 3.

Depending on the implementation of the BCI 308, the PMIC 300 has corresponding boot cluster detection circuitry 310 configured to receive and determine the boot cluster based on the BCI signal. For example, the boot cluster detection circuitry 310 can decode a binary-coded value, a one-hot binary value, a pulse width modulated signal, a train of digital pulses, and/or an analog signal (e.g., voltage or resistive value). In one example, the boot cluster detection circuitry 310 may include binary decoder circuitry that takes a binary input and produces an output that identifies the boot cluster. In one example, the boot cluster detection circuitry 310 may include PWM value decoding circuitry that can determine the duty cycle of a PWM signal, and based on the duty cycle, determine the corresponding boot cluster. In one example, the boot cluster detection circuitry 310 may include a pulse train decoder that can measure the pulse width and pulse rate of a train of digital pulses, and based on the measured values, determine the corresponding boot cluster. In one example, the boot cluster detection circuitry 310 may include analog signal processing circuitry that can measure an analog BCI signal (e.g., voltage and/or resistive value), and based on the measured analog value, determine the corresponding boot cluster.

In some aspects, the PMIC 300 can output a reset signal 312 to control the power on sequence of the SoC 302. The PMIC can assert the reset signal 312 to keep the SoC 302 in a reset state, and de-assert the reset signal 312 to bring the SoC 302 out of a reset state so that the SoC can perform a boot sequence.

Figure 4:
FIG. 4 is a flow chart illustrating a first exemplary power-on (PON) sequence using a boot cluster indication according to some aspects of the present disclosure.
Figure 4:
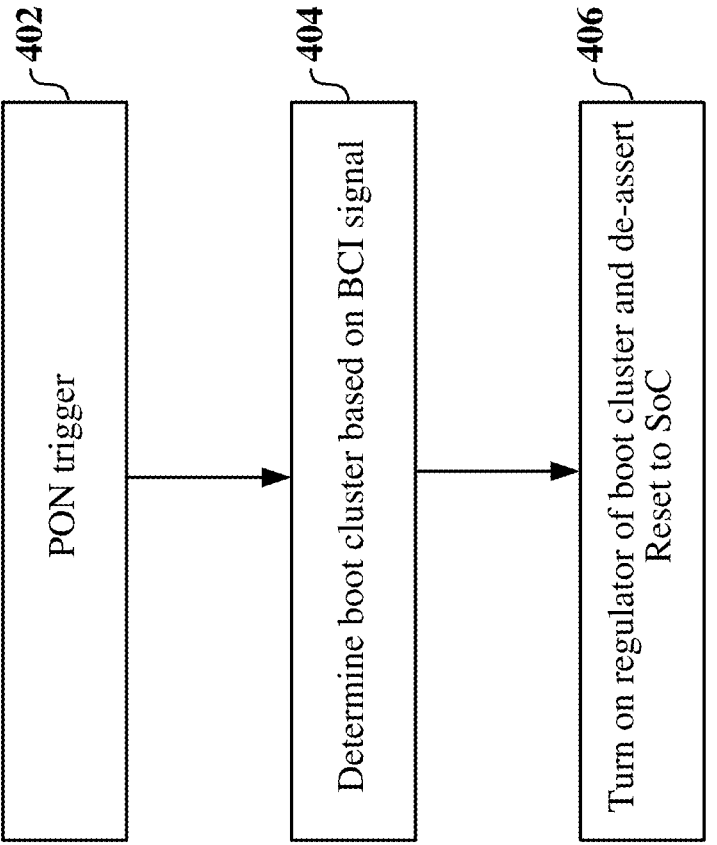

FIG. 4 is a flow chart illustrating an exemplary power-on (PON) sequence 400 using a boot cluster indication signal according to some aspects of the disclosure. In one aspect, the PON sequence 400 can be implemented using any PMIC and SoC described above in relation to FIGS. 1-3. In other examples, the PON sequence 400 can be implemented in any computer system using a PON sequence.

At 402, a PON trigger event occurs in a computer system that includes a SoC and a PMIC. For example, a user can operate a power switch (e.g., power switch 108 of FIG. 1) to send a signal (trigger event) to the PMIC to turn on a power supply of the system. In some aspects, the power supply can supply standby power to the PMIC before the trigger event so that the PMIC can function before the power supply is fully turned on or enabled to supply power to the SoC. At this stage, the PMIC does not turn on the voltage regulators (e.g., voltage regulators 502, 504, 506, and 508 in FIG. 5) that power the voltage rail of the clusters in the SoC. The clusters the of SoC may have separate voltage rails (supply voltages) that can receive power from different regulators of the PMIC. The PMIC takes the input power from a power supply and distributes the power to different voltage rails in the SoC. The PMIC can regulate the voltage levels of the rails, ensuring that they remain within the specified limits to prevent damage to the components and ensure stable and reliable operation.

After the PON trigger event, the PON sequence can include various stages, for example, a MX stage, a CX stage, an I/O stage, a PHY stage, and a CLK stage. In the MX stage, the PMIC can supply initial or standby power to operate the SoC in a low-power mode or pre-booting mode, with only certain circuitry active, for example, the boot circuit identifying circuitry 304. In the CX stage, the SoC can enable the regulators for digital logic. During the I/O stage, the SoC can power on the various I/O interfaces, such as communication interfaces, controllers, and Ethernet interfaces. In the PHY stage, the SoC can power on its physical layer interfaces. In the CLK stage, the SoC can initialize the clocks for the reference clocks and external interfaces. This stage can involve setting the clock frequency, duty cycle, and phase of the various clocks used by the external interfaces. The above-described PON sequence stages can occur in other orders different from that described above. For example, the PHY and CLK stages may occur simultaneously or in any order depending on the specific SoC design. In some aspects, some stages described above may not be present, and other stages may be added.

At 404, the PON sequence determines the boot cluster based on a boot circuit indicator (BCI) signal as described above in relation to FIGS. 1-3. For example, the SoC (e.g., BGI circuitry 304) can send a boot circuit indicator (BCI) signal to the PMIC. In some aspects, the BCI signal can encode the boot cluster information using a binary-coded value, a one-hot binary value, a PWM signal, a train of digital pulses, or an analog signal (e.g., voltage or resistive value).

In one aspect, the PMIC can use the boot cluster detection circuitry 310 to decode the BCI signal. In one example, the boot cluster detection circuitry 310 includes binary decoder circuitry that takes a binary input and produces an output that identifies the boot cluster (e.g., cluster 0 or 1). In one example, the boot cluster detection circuitry 310 may include a PWM decoder that can determine the duty cycle of a PWM signal. Based on the duty cycle, the boot cluster detection circuitry 310 can determine the corresponding boot cluster. In one example, the boot cluster detection circuitry 310 may include a pulse train decoder that can measure the pulse width and pulse rate of a train of digital pulses, then the pulse train decoder can determine the corresponding boot cluster indicated by the train of digital pulses. In one example, the boot cluster detection circuitry 310 can include analog signal processing circuitry that can measure an analog BCI signal (e.g., voltage and/or resistive value). Based on the measured analog value, the boot cluster detection circuitry 310 can determine the corresponding boot cluster.

At 406, the PON sequence can enable the boot cluster based on the decoded BCI. For example, the PMIC can turn on or enable the voltage regulator to supply the voltage rail of the boot cluster identified by the BCI signal. After the regulator is turned on, the PMIC can take the SoC out of a reset condition, for example, by de-asserting a reset signal applied to the SoC.

Figure 5:
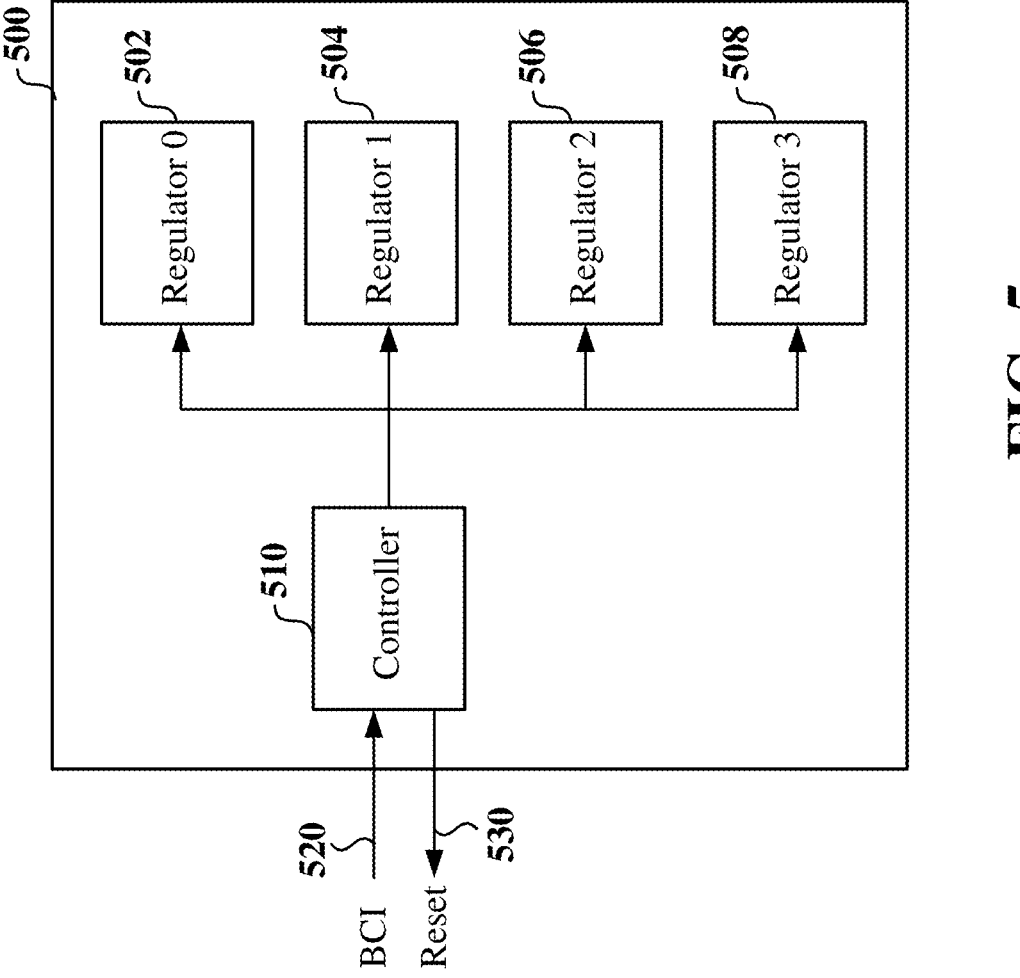
FIG. 5 is a block diagram illustrating exemplary power circuitry of a PMIC according to some aspects of the present disclosure.

FIG. 5 is a block diagram illustrating exemplary power circuitry 500 of a PMIC according to some aspects of the disclosure. The power circuitry 500 may be included in any of the PMICs described above in relation to FIGS. 1-4. The power circuitry 500 can include a number of power regulators that can supply power and regulated voltages to computing clusters of a SoC. For example, a first regulator 502 can supply power to a first cluster, a second regulator 504 can supply power to a second cluster, a third regulator 506 can supply power to a third cluster, and a fourth regulator 508 can supply power to a fourth cluster. In one example, the clusters may be cluster 120, cluster 122, cluster 124, and cluster 126 of FIG. 1. The power circuitry 500 may include a controller 510 that can control the regulators to turn on or off (enabled or disabled) based on the BCI signal 520. After the controller 510 turns on the regulator of the boot cluster, the controller 510 can de-assert the reset signal 530 (e.g., reset 312 of FIG. 3) to bring the SoC out of reset to start the boot process.

Figure 6:
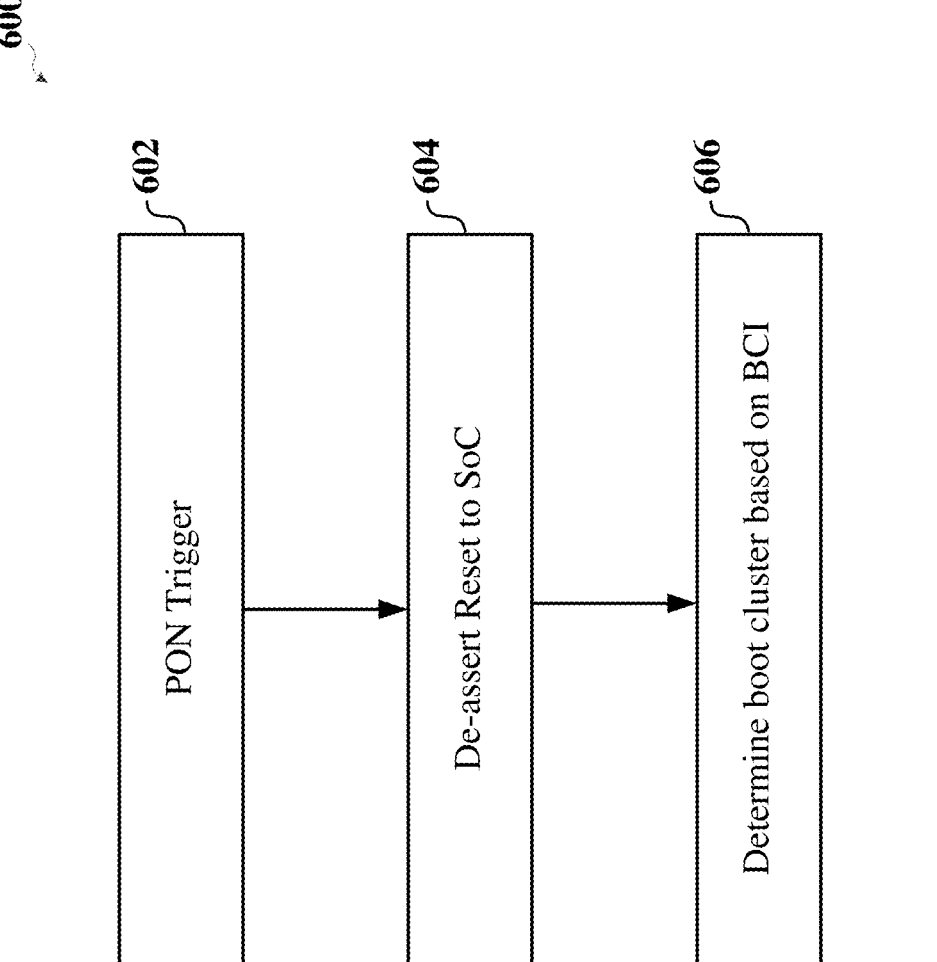
FIG. 6 is a flow chart illustrating a second exemplary PON sequence using a boot cluster indication according to some aspects of the present disclosure.

FIG. 6 is a flow chart illustrating a second exemplary power-on (PON) sequence 600 using a boot cluster indication signal according to some aspects of the disclosure. In one aspect, the PON sequence 600 can be implemented using any PMIC and SoC described above in relation to FIGS. 1-3. In other examples, the PON sequence 600 can be implemented in any computer system that uses a power-on sequence to power up a boot core/cluster.

At 602, a PON trigger event occurs in a computer system that includes a SoC and a PMIC. For example, a user can operate a power switch (e.g., power switch 108 of FIG. 1) to send a signal (trigger event) to the PMIC to turn on a power supply of the system. In some aspects, the power supply can supply standby power to the PMIC before the trigger event so that the PMIC can function before the power supply is fully turned on to supply power to the computer system. At this stage, the PMIC has not turned on or enabled the voltage regulators (e.g., voltage regulators 502, 504, 506, and 508 of FIG. 5) that power the voltage rails of the clusters in the SoC. The clusters the of SoC may have separate voltage rails (supply voltages) that can receive power from different regulators of the PMIC. The PMIC can take the input power from a power supply and output respective power to different voltage rails in the SoC. The PMIC can regulate the voltage levels of the voltage rails, ensuring that they remain within the specified limits to prevent damage to the components and ensure stable and reliable operation. After the PON trigger event, the PON sequence can include various stages, for example, a MX stage, a CX stage, an I/O stage, a PHY stage, and a CLK stage. In some aspects, some of these stages may not be present in the PON sequence, and other stages may be added.

At 604, the PON sequence can de-assert a reset signal applied to the SoC. The PMIC can take the SoC out of a reset condition, for example, by de-asserting the reset signal. In some aspects, de-asserting the reset signal can enable the SoC to generate a BCI signal to indicate the boot cluster. For example, the SoC can read the states of a plurality of fuses to determine the boot cluster. The state of each fuse can be either opened or closed. To that end, the PMIC can supply power to the SoC to power the circuitry that is used for reading the fuses and generating the BCI signal. For example, the PMIC can supply power to enable the boot circuit identifying circuitry 304 of the SoC to read the states of the fuses 306.

At 606, the PON sequence can determine the boot cluster based on a BCI signal received from the SoC as described above in relation to FIGS. 1-3. For example, the SoC (e.g., BGI circuitry 304) can send a BCI signal to the PMIC. In some aspects, the BCI signal can encode the boot cluster information using a binary-coded value, a one-hot binary value, a PWM signal, a train of digital pulses, or an analog signal (e.g., voltage or resistive value). At this stage, the SoC can wait for the BCI signal to be read by the PMIC. After the PMIC determines the boot cluster based on the BCI signal, the PMIC can turn on a regulator (e.g., regulator 502, 504, 506, or 508) to supply power to the boot cluster. Then, the SoC can start the boot process (e.g., PBL operations) using the boot cluster identified by the BCI signal.

FIG. 7 is a block diagram illustrating exemplary boot cluster indication circuitry according to some aspects of the disclosure. In one example, a SoC may include first boot circuit identifying circuitry 702, and a PMIC may include boot cluster detection circuitry 704. The SoC may be any of the SoCs described above in relation to FIGS. 1-6. The PMIC may be any of the PMICs described above in relation to FIGS. 1-6.

The first boot circuit identifying circuitry 702 can output an analog BCI signal 706 to the boot cluster detection circuitry 704. The BCI signal 706 can be set to a certain signal value to identify the boot cluster or boot core of the SoC. In one example, the SoC may be an analog signal that can be set to different analog values to identify a corresponding boot cluster among a plurality of computing clusters of the SoC. For example, the first boot circuit identifying circuitry 702 may include selection control circuitry 708 that can control a number of transistors (e.g., T1, T2, and T3) to control a configuration of a resistor network (e.g., R1, R2, R3, R4, and R5) so the BCI signal 706 can be set to different analog values. The boot cluster detection circuitry 704 may include an analog-to-digital converter (ADC) 710 that can convert the analog BCI signal to a corresponding digital value that identifies the boot cluster. By controlling the transistors (turned on or off), the selection control circuitry 708 can configure the voltage divider network to provide different analog voltages for the BCI signal.

FIG. 8 illustrates a table 800 of exemplary mapping between analog values and boot clusters according to some aspects of the disclosure. When the BCI signal 706 has an analog value of V0, the ADC 710 can convert the value V0 to the digital value 00 that identifies the boot cluster 0. When the BCI signal 706 has an analog value of V1, the ADC 710 can convert the analog value V1 to the digital value 00 that identifies the boot cluster 1. When the BCI signal 706 has an analog value of V2, the ADC 710 can convert the analog value V2 to the digital value 10 that identifies the boot cluster 2. When the BCI signal 706 has an analog value of V3, the ADC 710 can convert the value V3 to the digital value 11 that identifies the boot cluster 1. In other examples, the analog values may have fewer or more than four values to identify fewer or more than four boot clusters.

FIG. 9 illustrates a flow chart of a method 900 for indicating a a circuit of a computer system to be enabled in a power-on sequence according to some aspects of the present disclosure. In one example, the method 900 can be performed using any of the SoCs described above in relation to FIGS. 1-7. In other aspects, the method 900 may be adapted to suit other computer systems.

At 910, a computer system can output a boot circuit indicator (BCI) signal to a power management integrated circuit (PMIC). The BCI signal identifies a circuit (e.g., a boot cluster among a plurality of computing clusters) of the computer system to be enabled in a power-on (PON) sequence of the computer system. In one example, the boot circuit identifying circuitry 304 (see FIG. 3) can provide a means to output the BCI signal. In one example, the boot circuit identifying circuitry may include boot circuit identifying circuitry 702 (see FIG. 7) configured to generate the BCI signal based on the states of fuses included in the computer system (e.g., SoC). In some aspects, the BCI signal may be a binary-coded signal, a PWM signal, a train of digital pulses, or an analog signal. In some aspects, the BCI signal can be any signal that can be set to three or more values or states to identify a boot cluster among a plurality of computing clusters.

At 920, the computer system can receive power from the PMIC to supply power to the circuit (e.g., boot cluster) identified by the BCI signal in the PON sequence. In one example, the power circuitry 130 (FIG. 1) can provide a means to receive power supplied from the PMIC. For example, the power circuitry 130 (FIG. 1) can receive different voltage rails respectively corresponding to different computing clusters of the SoC.

In some aspects, the boot circuit identifying circuitry can include a plurality of resistors that form a voltage divider network with one or more resistors of the PMIC. In some aspects, the computer system includes a plurality of fuses configured to indicate the boot cluster. For example, each cluster may have an associated fuse that can be opened to indicate a boot cluster. The boot circuit identifying circuitry can be configured to detect respective states (e.g., opened or closed) of the plurality of fuses to determine the boot cluster.

In some aspects, the boot circuit identifying circuitry can be configured to encode the states of the plurality of fuses to produce the BCI signal that identifies the boot cluster. In some aspects, the power circuitry can be further configured to receive power to enable the boot cluster to perform primary boot loader (PBL) operations, while other clusters of the plurality of computing clusters are not enabled or powered during the PBL operations.

In some aspects, the boot circuit identifying circuitry can be configured to output the BCI signal prior to or after a de-assertion of a reset input of the computer system.

FIG. 10 illustrates a flow chart of a method 1000 for supplying power to a computer system based on a boot circuit indicator signal according to some aspects of the present disclosure. In one example, the method 1000 can be performed using any of the PMICs described above in relation to FIGS. 1-7. In other aspects, the method 1000 may be adapted to suit other computer systems.

At 1010, a PMIC can receive a boot circuit indicator (BCI) signal from a computer system. For example, the computer system may be a SoC including a plurality of computing clusters. One of the computing clusters can be the boot cluster (e.g., cluster 0 or 1). The BCI signal identifies a circuit (e.g., a boot cluster among the plurality of computing clusters) of the computer system to be enabled in a power-on (PON) sequence of the computer system. In one example, the computer system can be any of the SoCs or computer systems described above in relation to FIGS. 1-7. In some aspects, the BCI signal may be a binary-coded signal, a PWM signal, a train of digital pulses, or an analog signal. In some aspects, the BCI signal can be any signal that can be set to three or more values or states to identify a boot cluster among a plurality of computing clusters. In one example, the boot cluster detection circuitry 310 (see FIG. 3) can provide a means to decode the BCI signal to determine the boot cluster identified by the BCI signal.

At 1020, the PMIC can supply power to the circuit (e.g., boot cluster) identified by the BCI signal in the PON sequence. In one example, the controller 510 (see FIG. 5) and one of the voltage regulators 502, 504, 506, and 508 can provide a means to supply power to the circuit (e.g., boot cluster) identified by the BCI signal. Using the BCI signal, the PMIC can selectively supply power to only the circuit (e.g., boot cluster) identified by the BCI to be enabled in the PON sequence and not supply power to other circuits (e.g., other computing clusters) in the PBL operations. Therefore, power can be saved during the PBL operations. In some aspects, the PMIC can de-assert a reset input of the computer system prior to or after receiving the BCI signal.

In some aspects, the boot cluster detection circuitry is further configured to interpret or decode the BCI signal to determine the boot cluster. In some aspects, the power circuitry includes a plurality of voltage regulators respectively configured to supply power or voltage rails to the plurality of computing clusters. The power circuitry can be configured to enable one of the plurality of power regulators to supply power to the boot cluster during primary boot loader (PBL) operations, other power regulators of the plurality of power regulators not being enabled during the PBL operations.

The following provides an overview of examples of the present disclosure.

A first aspect of the disclosure provides a computer system. The computer system comprises boot circuit identifying circuitry configured to output a boot circuit indicator (BCI) signal to a power management integrated circuit (PMIC), the BCI signal identifying a circuit of the computer system to be enabled in a power-on (PON) sequence of the computer system. The computer system further comprises power circuitry configured to receive power from the PMIC to supply power to the circuit identified by the BCI signal in the PON sequence.

In a second aspect of the disclosure, alone or in combination with the first aspect, the computer system further comprises a plurality of computing clusters, wherein the circuit identified by the BCI signal comprises a boot cluster among the plurality of computing clusters.

In a third aspect of the disclosure, alone or in combination with the second aspect, the computer system further comprises a plurality of fuses configured to indicate the boot cluster, the boot circuit identifying circuitry being configured to detect respective states of the plurality of fuses to determine the boot cluster.

In a fourth aspect of the disclosure, alone or in combination with the third aspect, wherein the boot circuit identifying circuitry is configured to encode the states of the plurality of fuses to produce the BCI signal that identifies the boot cluster.

In a fifth aspect of the disclosure, alone or in combination with any of the second, third, and fourth aspects, wherein the power circuitry is further configured to: receive power to enable the boot cluster to perform primary boot loader (PBL) operations, other clusters of the plurality of computing clusters not being enabled in the PBL operations.

In a sixth aspect of the disclosure, alone or in combination with any of the first, second, third, and fourth aspects, wherein the boot circuit identifying circuitry is configured to output the BCI signal in response to a de-assertion of a reset input of the computer system.

In a seventh aspect of the disclosure, alone or in combination with any of the first, second, third, and fourth aspects, wherein the boot circuit identifying circuitry is configured to output the BCI signal prior to a de-assertion of a reset input of the computer system.

In an eighth aspect of the disclosure, alone or in combination with any of the first, second, third, and fourth aspects, wherein the boot circuit identifying circuitry is configured to indicate the circuit identified by the BCI signal using: a binary-coded signal; a pulse width modulated signal; a train of digital pulses; or an analog signal.

In a ninth aspect of the disclosure, alone or in combination with any of the first, second, third, and fourth aspects, wherein the boot circuit identifying circuitry comprises a plurality of resistors that form a voltage divider network with one or more resistors of the PMIC, an output of the voltage divider network corresponding to the BCI signal.

A tenth aspect of the disclosure provides a power management integrated circuit (PMIC). The PMIC comprises boot circuit detection circuitry configured to receive a boot circuit indicator (BCI) signal from a computer system, the BCI signal identifying a circuit of the computer system to be enabled in a power-on (PON) sequence of the computer system. The PMIC further comprises power circuitry configured to supply power to the circuit identified by the BCI signal in the PON sequence.

In an eleventh aspect of the disclosure, alone or in combination with the tenth aspect, wherein the circuit identified by the BCI signal comprises a boot cluster among a plurality of computing clusters of the computer system.

In a twelfth aspect of the disclosure, alone or in combination with the eleventh aspect, wherein the boot circuit detection circuitry is further configured to interpret the BCI signal to determine the boot cluster, wherein the BCI signal represents the boot cluster using: a binary-coded signal; a pulse width modulated signal; a train of digital pulses; or an analog signal.

In a thirteenth aspect of the disclosure, alone or in combination with any of the eleventh and twelfth aspects, wherein the power circuitry comprises: a plurality of voltage regulators respectively configured to supply power to the plurality of computing clusters, wherein the power circuitry is further configured to enable one of the plurality of voltage regulators to supply power to the boot cluster in primary boot loader (PBL) operations, other voltage regulators of the plurality of voltage regulators not being enabled in the PBL operations.

In a fourteenth aspect of the disclosure, alone or in combination with any of the tenth, eleventh, and twelfth aspects, wherein the power circuitry is further configured to de-assert a reset input of the computer system prior to receiving the BCI signal.

In a fifteenth aspect of the disclosure, alone or in combination with any of the tenth, eleventh, and twelfth aspects, wherein the power circuitry is further configured to de-assert a reset input of the computer system in response to receiving the BCI signal.

A sixteenth aspect of the disclosure provides a method of booting up a computer system. The method comprises outputting a boot circuit indicator (BCI) signal to a power management integrated circuit (PMIC), the BCI signal identifying a circuit of the computer system to be enabled in a power-on (PON) sequence of the computer system. The method further comprises receiving power from the PMIC, the power destinated to the circuit identified by the BCI signal in the PON sequence.

In a seventeenth aspect of the disclosure, alone or in combination with the sixteenth aspect, wherein the circuit identified by the BCI signal comprises a boot cluster among a plurality of computing clusters of the computer system.

In an eighteenth aspect of the disclosure, alone or in combination with the seventeenth aspect, the method further comprises: detecting respective states of a plurality of fuses configured to indicate the boot cluster; and determine the boot cluster based on the respective states of the plurality of fuses.

In a nineteenth aspect of the disclosure, alone or in combination with the eighteenth aspect, the method further comprises encoding the respective states of the plurality of fuses to produce the BCI signal that identifies the boot cluster.

In a twentieth aspect of the disclosure, alone or in combination with any of the seventeenth, eighteenth, and nineteeth aspects, wherein the receiving power from the PMIC comprises: receiving power to enable the boot cluster to perform primary boot loader (PBL) operations, other clusters of the plurality of computing clusters not being enabled in the PBL operations.

In a twenty-first aspect of the disclosure, alone or in combination with any of the sixteenth, seventeenth, eighteenth, and nineteeth aspects, wherein the outputting the BCI signal comprises outputting the BCI signal in respone to a de-assertion of a reset input.

In a twenty-second aspect of the disclosure, alone or in combination with any of the sixteenth, seventeenth, eighteenth, and nineteeth aspects, wherein the outputting the BCI signal comprises outputting the BCI signal prior to a de-assertion of a reset input.

In a twenty-third aspect of the disclosure, alone or in combination with any of the sixteenth, seventeenth, eighteenth, and nineteeth aspects, wherein the BCI signal indicates the circuit to be enabled in the PON sequence using: a binary-coded signal; a pulse width modulated signal; a train of digital pulses; or an analog signal.

In a twenty-fourth aspect of the disclosure, alone or in combination with any of the sixteenth, seventeenth, eighteenth, and nineteeth aspects, the method further comprises setting a voltage of the BCI signal using a voltage divider network that comprises a plurality of resistors included in the computer system and one or more resistors of the PMIC.

A twenty-fifth aspect of the disclosure provides a method of supplying power using a power management integrated circuit (PMIC). The method comprises receiving a boot circuit indicator (BCI) signal from a computer system, the BCI signal identifying a circuit of the computer system to be enabled in a power-on (PON) sequence of the computer system. The method further comprises supplying power to the circuit identified by the BCI signal in the PON sequence.

In a twenty-sixth aspect of the disclosure, alone or in combination with the twenty-fifth aspect, wherein the circuit identified by the BCI signal comprises a boot cluster among a plurality of computing clusters of the computer system.

In a twenty-seventh aspect of the disclosure, alone or in combination with the twenty-sixth aspect, the method further comprises interpreting the BCI signal to determine the boot cluster, wherein the BCI signal represents the boot cluster using: a binary-coded signal; a pulse width modulated signal; a train of digital pulses; or an analog signal.

In a twenty-eighth aspect of the disclosure, alone or in combination with any of the twenty-sixth and twenty-seventh aspects, wherein the supplying power comprises: enabling a corresponding one of a plurality of voltage regulators to supply power to the boot cluster in primary boot loader (PBL) operations, other voltage regulators of the plurality of voltage regulators configured to supply power to other clusters of the plurality of computing clusters not being enabled in the PBL operations.

In a twenty-nineth aspect of the disclosure, alone or in combination with any of the twenty-fifth, twenty-sixth, and twenty-seventh aspects, the method further comprises de-asserting a reset input of the computer system prior to receiving the BCI signal.

In a thirtieth aspect of the disclosure, alone or in combination with any of the twenty-fifth, twenty-sixth, and twenty-seventh aspects, the method further comprises de-asserting a reset input of the computer system after receiving the BCI signal.

It is to be appreciated that the present disclosure is not limited to the exemplary terms used above to describe aspects of the present disclosure. For example, bandwidth may also be referred to as throughput, data rate or another term. Similarly, a boot cluster may also refer to any hardware or circuitry that is enabled or used in a PON sequence using the boot cluster.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A computer system comprising:
    boot circuit identifying circuitry configured to output a boot circuit indicator (BCI) signal to a power management integrated circuit (PMIC), the BCI signal identifying a circuit of the computer system to be enabled in a power-on (PON) sequence of the computer system, wherein the boot circuit identifying circuitry is configured to control a configuration of a resistor network to form a voltage divider network with one or more resistors of the PMIC, to set the BCI signal to an analog value identifying the circuit to be enabled in the PON sequence; and
    power circuitry configured to receive power from the PMIC to supply power to the circuit identified by the BCI signal in the PON sequence,
    wherein the BCI signal comprises the analog value, configured to indicate the circuit to be enabled in the PON sequence.

2. The computer system of claim 1, further comprising:
    a plurality of computing clusters,
    wherein the circuit identified by the BCI signal comprises a boot cluster among the plurality of computing clusters.

3. The computer system of claim 2, further comprising:
    a plurality of fuses configured to indicate the boot cluster,
    the boot circuit identifying circuitry being configured to detect respective states of the plurality of fuses to determine the boot cluster.

4. The computer system of claim 3, wherein the boot circuit identifying circuitry is configured to encode the states of the plurality of fuses to produce the BCI signal that identifies the boot cluster.

5. The computer system of claim 2, wherein the power circuitry is further configured to:
    receive power to enable the boot cluster to perform primary boot loader (PBL) operations, other clusters of the plurality of computing clusters not being enabled in the PBL operations.

6. The computer system of claim 1, wherein the boot circuit identifying circuitry is configured to output the BCI signal in response to a de-assertion of a reset input of the computer system.

7. The computer system of claim 1, wherein the boot circuit identifying circuitry is configured to output the BCI signal prior to a de-assertion of a reset input of the computer system.

8. A power management integrated circuit (PMIC) comprising:
    boot circuit detection circuitry configured to receive a boot circuit indicator (BCI) signal from a computer system, the BCI signal identifying a circuit of the computer system to be enabled in a power-on (PON) sequence of the computer system, wherein the PMIC is configured to form a voltage divider network with one or more resistors of the PMIC and one or more resistors of the computer system, to set the BCI signal to an analog value identifying the circuit of the computer system to be enabled in the PON sequence; and
    power circuitry configured to supply power to the circuit identified by the BCI signal in the PON sequence,
    wherein the BCI signal comprises the analog value, configured to indicate the circuit to be enabled in the PON sequence.

9. The PMIC of claim 8, wherein the circuit identified by the BCI signal comprises a boot cluster among a plurality of computing clusters of the computer system.

10. The PMIC of claim 9, wherein the power circuitry comprises:
    a plurality of voltage regulators respectively configured to supply power to the plurality of computing clusters,
    wherein the power circuitry is further configured to enable one of the plurality of voltage regulators to supply power to the boot cluster in primary boot loader (PBL) operations, other voltage regulators of the plurality of voltage regulators not being enabled in the PBL operations.

11. The PMIC of claim 8, wherein the power circuitry is further configured to de-assert a reset input of the computer system prior to receiving the BCI signal.

12. The PMIC of claim 8, wherein the power circuitry is further configured to de-assert a reset input of the computer system in response to receiving the BCI signal.

13. A method of booting up a computer system, comprising:
    Controlling, by a boot circuit identifying circuitry of the computer system, a configuration of a resistor network to form a voltage divider network with one or more resistors of a power management integrated circuit (PMIC), to set a boot circuit indicator (BCI) signal to an analog value identifying a circuit to be enabled in a PON sequence;
    outputting the BCI signal to the PMIC, the BCI signal identifying the circuit of the computer system to be enabled in the power-on (PON) sequence of the computer system; and receiving power from the PMIC, the power destinated to the circuit identified by the BCI signal in the PON sequence, wherein the BCI signal comprises the analog value, configured to indicate the circuit to be enabled in the PON sequence.

14. The method of claim 13, wherein the circuit identified by the BCI signal comprises a boot cluster among a plurality of computing clusters of the computer system.

15. The method of claim 14, further comprises:

detecting respective states of a plurality of fuses configured to indicate the boot cluster; and determine the boot cluster based on the respective states of the plurality of fuses.

16. The method of claim 15, further comprising:

encoding the respective states of the plurality of fuses to produce the BCI signal that identifies the boot cluster.

17. The method of claim 14, wherein the receiving power from the PMIC comprises:

receiving power to enable the boot cluster to perform primary boot loader (PBL) operations, other clusters of the plurality of computing clusters not being enabled in the PBL operations.

18. The method of claim 13, wherein the outputting the BCI signal comprises:

outputting the BCI signal in response to a de-assertion of a reset input.

19. The method of claim 13, wherein the outputting the BCI signal comprises:

outputting the BCI signal prior to a de-assertion of a reset input.

20. A method of supplying power using a power management integrated circuit (PMIC) comprising:

forming a voltage divider network with one or more resistors of a computer system and one or more resistors of the PMIC, to set a boot circuit indicator (BCI) signal to an analog value identifying a computer system circuit of the computer system to be enabled in a PON sequence;

receiving the BCI signal from the computer system, the BCI signal identifying the circuit of the computer system to be enabled in the power-on (PON) sequence of the computer system; and supplying power, by the PMIC to the circuit identified by the BCI signal in the PON sequence, wherein the BCI signal comprises the analog value, configured to indicate the circuit to be enabled in the PON sequence.

21. The method of claim 20, wherein the circuit identified by the BCI signal comprises a boot cluster among a plurality of computing clusters of the computer system.

22. The method of claim 21, wherein the supplying power comprises:

enabling a corresponding one of a plurality of voltage regulators to supply power to the boot cluster in primary boot loader (PBL) operations, other voltage regulators of the plurality of voltage regulators configured to supply power to other clusters of the plurality of computing clusters not being enabled in the PBL operations.

23. The method of claim 20, further comprising:

de-asserting a reset input of the computer system prior to receiving the BCI signal.

24. The method of claim 20, further comprising:

de-asserting a reset input of the computer system in response to receiving the BCI signal.

* * * * *